(12) United States Patent
Dickey et al.

(10) Patent No.: US 6,480,379 B1
(45) Date of Patent: Nov. 12, 2002

(54) REMOVABLE COMPONENT FILTER

(75) Inventors: David Dickey, Auburn; Richard B. Nelson, Granite Bay, both of CA (US); Seiya Ohta, NewCastle, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 20 days.

(21) Appl. No.: 09/677,692

(22) Filed: Sep. 29, 2000

(51) Int. Cl.[7] .................... H05K 7/20; G11B 33/14; G06F 1/20
(52) U.S. Cl. ............... 361/687; 361/690; 361/695; 361/731; 454/184
(58) Field of Search .................. 361/676–678, 361/687–695, 728–731; 165/80.3, 104.34; 454/184, 185, 186

(56) References Cited

U.S. PATENT DOCUMENTS

| | | | | |
|---|---|---|---|---|
| 4,186,422 A | * | 1/1980 | Laermer | 361/689 |
| 4,672,509 A | * | 6/1987 | Speraw | 165/122 |
| 4,731,702 A | * | 3/1988 | Hiatt et al. | 361/725 |
| 5,119,270 A | * | 6/1992 | Bolton et al. | 165/80.3 |
| 5,119,497 A | * | 6/1992 | Freige et al. | 361/685 |
| 5,247,427 A | * | 9/1993 | Driscoll et al. | 211/26 |
| 5,687,063 A | * | 11/1997 | Chabert | 361/726 |
| 5,783,777 A | * | 7/1998 | Kruse et al. | 174/66 |
| 6,166,919 A | * | 12/2000 | Nicolici et al. | 174/35 R |
| 6,188,573 B1 | * | 2/2001 | Urita | 165/80.3 |

FOREIGN PATENT DOCUMENTS

| | | | | |
|---|---|---|---|---|
| JP | 11-145658 A | * | 5/1999 | H05K/7/20 |
| WO | WO 00/52695 A1 | * | 9/2000 | G11B/33/14 |

* cited by examiner

*Primary Examiner*—Anatoly Vortman

(57) ABSTRACT

A cost effective and easily manufactured filler for a removable system component. A hard disk drive filler embodiment is disclosed having five exterior sides and internal baffles to simulate the airflow modifying characteristics of a hard disk drive. The hard disk drive filler is stackable, flame-resistant, and is manufactured by an injection-molding process.

16 Claims, 4 Drawing Sheets

REMOVABLE COMPONENT FILTER

TECHNICAL FIELD

The present invention relates to removable components that are included in mechanical, electrical, and electromechanical systems, and that are cooled by airflow or by flow of a liquid substance, and, in particular, to a removable component filler that can be substituted for a removable component when the removable component is removed from the system to ensure that the flow characteristics of cooling and/or liquid within the system are not deleteriously impacted by removal of the removable component.

BACKGROUND OF THE INVENTION

It is increasingly common for mechanical, electromechanical, and electrical systems to be constructed from modular mechanical, electromechanical and electrical components. Modular components are easily interchanged for maintenance, for repair, and for enhancement made possible by new technologies and manufacturing methods embodied in, or applied to, one or more of the modular components that together compose a system. Modern computer systems and storage devices include large numbers of removable modular components, such as chips, printed circuit boards, disk drives, power supplies, and various peripheral devices and peripheral device controllers.

FIG. 1 shows a simple, abstract illustration of a disk array storage device. The disk array storage device 100 includes a housing 102 and a bank 104 of hard disk drives. Disk arrays have many additional components, including communications and power interconnects, logic circuits, memory, and firmware and/or software controllers that implement communications protocols and I/O request handling. These additional components are located within the housing 102, but are not explicitly shown in FIG. 1 because they are outside the scope of the present invention.

In many systems, particularly electrical and electromechanical systems, modular components may comprise various heat-generating subcomponents and may therefore produce significant amounts of heat during operation. The heat must often be actively dissipated from within a system to the environment surrounding the system so that the internal temperature of the system does not rise above a level at which operation of system components deteriorates or fails. In many systems, airflow is created by internal fans that draw air over the surface of components, exchanging heat from the components to the air stream, and push the heated air out of the system through vents. In other systems, fluids are passed over components or conducted through tubing surrounding components to provide similar heat exchange functionality, the heat taken up by the fluids released in external radiating devices.

FIG. 2 shows the disk array of FIG. 1 with two internal cooling fans. The cooling fans 202 and 204 draw air through an intake port 206 at the front of the disk array past the bank of hard disk drives 104 and exhaust the heated air through output ports 208 and 210 at the rear of the disk array. In order to design disk arrays in which hard disk drives are sufficiently cooled during operation of the disk array, disk array designers carefully consider and calculate the arrangement of hard disk drives within the disk array, the interspacings between the hard disk drives, the size of the intake port 206, the sizes of the output ports 208 and 210, and the airflow generation capacities of the electrical fans 202 and 204.

In many systems, modular components may be added to increase system capabilities and may be removed when the capabilities and capacities provided by the module components are not needed in the system, as well as removed for maintenance, repair, and upgrading. FIG. 3 shows the disk array illustrated in FIGS. 1 and 2 with one hard disk drive removed from the bank of disk drives. Removal of the hard disk drive creates an open slot 302. The open slot is, in this case, much larger in cross-sectional area with respect to the front of the enclosure than the total of the cross-sectional areas of the interspacings between the hard disk drives in a fully filled bank of disk drives, such as the bank of disk drives 104 in FIGS. 1 and 2. The large open slot introduced by removal of the hard disk drive creates a relatively large channel through which air drawn into the enclosure 102 by electrical fans (202 and 204 in FIG. 2) can pass, so that much of the air flow generated by the electrical fans will be diverted through the slot 302 rather than pass through the much tighter interspacings between hard disk drives. As a result of the diversion of the airflow, the careful considerations and calculations for air cooling of the hard disk drives within a fully filled bank of disk drives may be wholly inapplicable to a disk array from which a disk drive has been removed. In many cases, removal of a disk drive will result in inadequate cooling of many of the remaining disk drives that may, in turn, result in degradation or wholesale failure of operation of one or more disk drives or in physical damage to disk drives or other heat-sensitive components within the disk array.

There are a number of ways to approach the problem outlined above with reference to FIGS. 1–3. In one approach, cooling design engineers may attempt to anticipate the effects of removing one or more hard disk drives from a disk array and to provide sufficiently powerful fans and complex baffling mechanisms to ensure that adequate airflow is maintained around all hard disk drives within the disk array despite removal of one or more hard disk drives. Such sophisticated design work is expensive and may not provide reliable solutions in all cases, particularly for unanticipated patterns of hard disk drive removal. Such solutions also lead to expensive disk arrays that are difficult to manufacture and that may require increased levels of maintenance during their lifetimes.

FIG. 4 illustrates a second approach to alleviating the problem described with reference to FIGS. 1–3. In FIG. 4, a rectangular-block-like hard disk drive filler 402 is inserted into the open slot 302 resulting from removal of a hard disk drive from the bank of hard disk drives 104, the hard disk drive filler 402 shown partially inserted. The size and shape of the hard disk drive filler 402 approximates the size and shape of a hard disk drive so that, once the hard disk drive filler is fully inserted into the bank of disk drives 104, the airflow characteristics of the disk array will closely approximate the airflow of a disk array with a fully filled bank of disk drives.

The solution illustrated in FIG. 4 is commercially viable, but has certain disadvantages. The rectangular-block-like filler has six sides that together form a continuous surface in order to approximate the continuous surface of a hard disk drive. The hard disk drive filler cannot therefore be manufactured by cheap injection-molding processes from plastic materials, but needs to be manufactured by a blow-molding process, constructed from subcomponents, or machined from a block of suitable material. These alternative manufacturing methods are expensive in comparison to injection molding. Moreover, continuous-surface, six-sided fillers do not lend themselves to convenient stacking for storage and shipping and are rather heavy, both characteristics adding significant cost to the shipping costs required for providing hard disk drive fillers to customers.

In order to avoid the expense of continuous-surface, six-sided hard disk drive fillers, customers and disk array manufacturers have employed soft foam and rigid foam fillers, but such fillers generally prove to be inadequate. They are not durable, and may degrade rapidly during removal and replacement and may become deformed and otherwise deteriorate during use. Furthermore, such makeshift fillers generally do not conform to the close manufacturing tolerances of hard disk drives and disk arrays, so that the airflow around disk drives within a disk array may be sufficiently disturbed by the presence of a makeshift filler to cause undesirable heat retention within the disk array or components of the disk array.

For these reasons, users and manufacturers of disk arrays have sought a cost-effective but durable and economical hard disk drive filler to take the place of hard disk drives removed from banks of hard disk drives in disk drive arrays.

SUMMARY OF THE INVENTION

One embodiment of the present invention is a 5-sided, injection-molded, hard disk drive filler that provides airflow obstruction characteristics equivalent to those of hard disk drives. The 5-sided, injection-molded, hard disk drive filler is manufactured from fire-resistant polymers to include warning labels and alphanumeric identification. The 5-sided, injection-molded, hard disk drive filler is designed to be stackable, includes a molded handle to facilitate insertion and extraction, and includes hollow, wedge-shaped baffles to produce turbulent airflow across the hard disk drive filler.

DETAILED DESCRIPTION OF THE INVENTION

Figure 1:
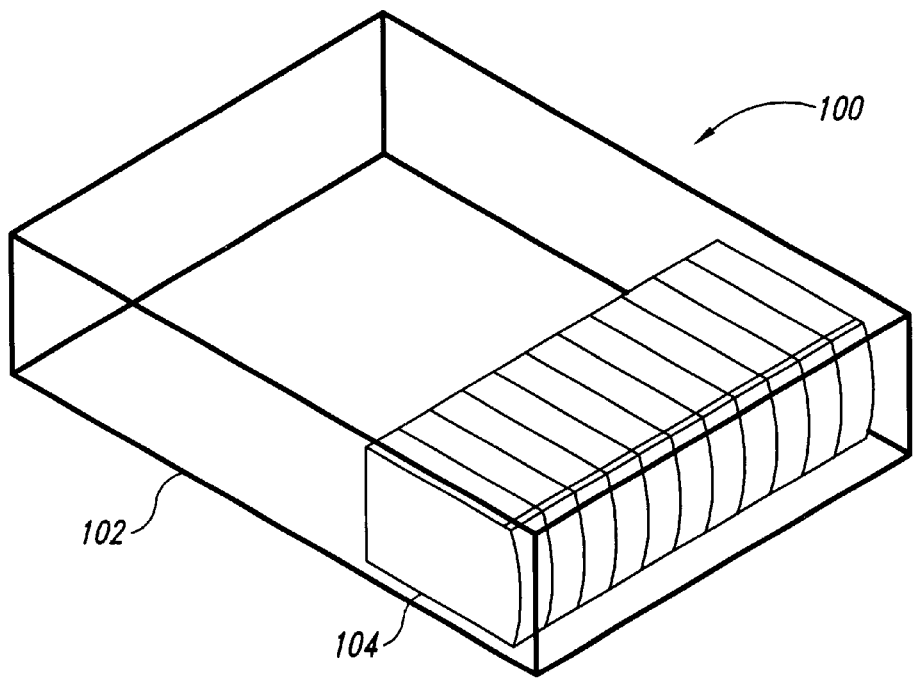
FIG. 1 shows a simple, abstract illustration of a disk array storage device.
Figure 2:
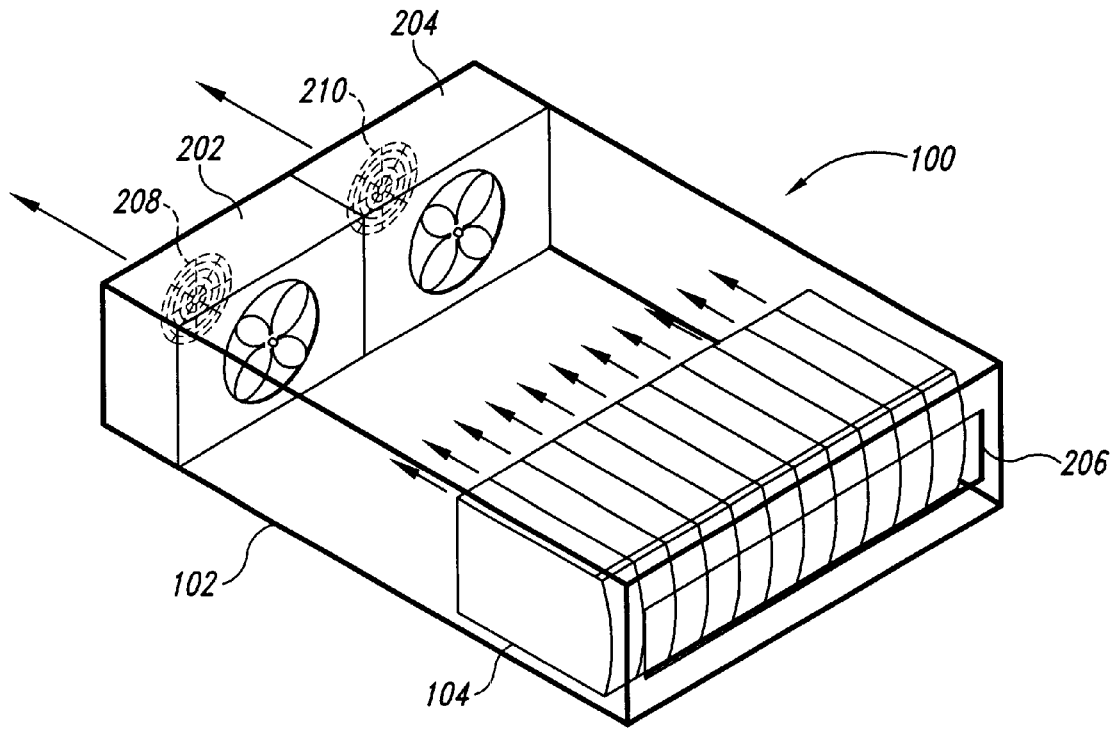
FIG. 2 shows the disk array of FIG. 1 with two internal cooling fans.
Figure 3:
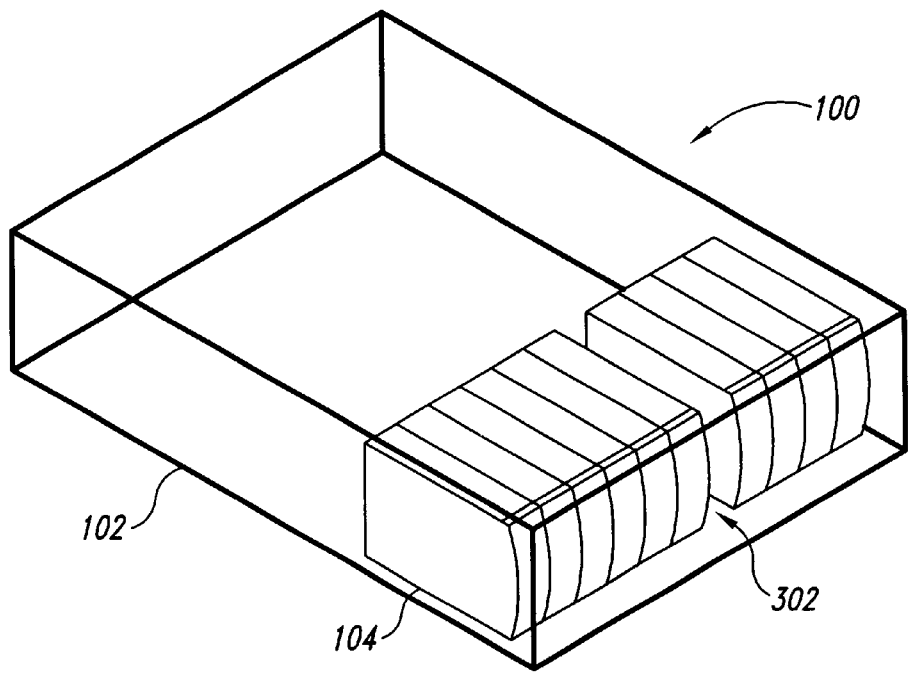
FIG. 3 shows the disk array illustrated in FIGS. 1 and 2 with one hard disk drive removed from the bank of disk drives.

One embodiment of the present invention is directed to a cost-effective and economical hard disk drive filler for inserting into open slots within a bank of disk drives within a disk array. When open slots in a bank of disk drives are not filled, as described above with reference to FIGS. 1–3, disturbance in the flow of air around the remaining hard disk drives within the disk array may occur, leading to ineffective cooling of the hard disk drives and deterioration or failure of operation of the hard disk drives and to physical damage to the hard disk drives or to other heat-sensitive components within the disk array.

Figure 5:
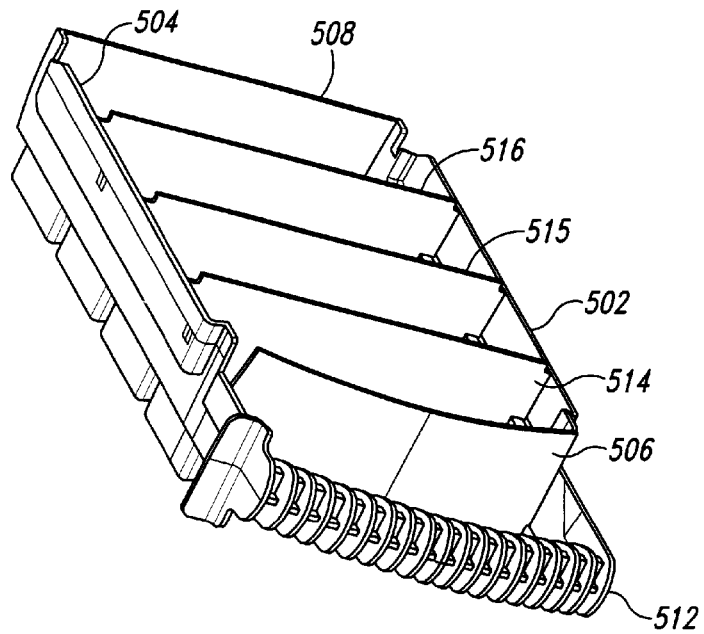
FIG. 5 shows an isometric representation of five-sided hard disk drive filler viewed from front to back and from top to bottom.
Figure 6:
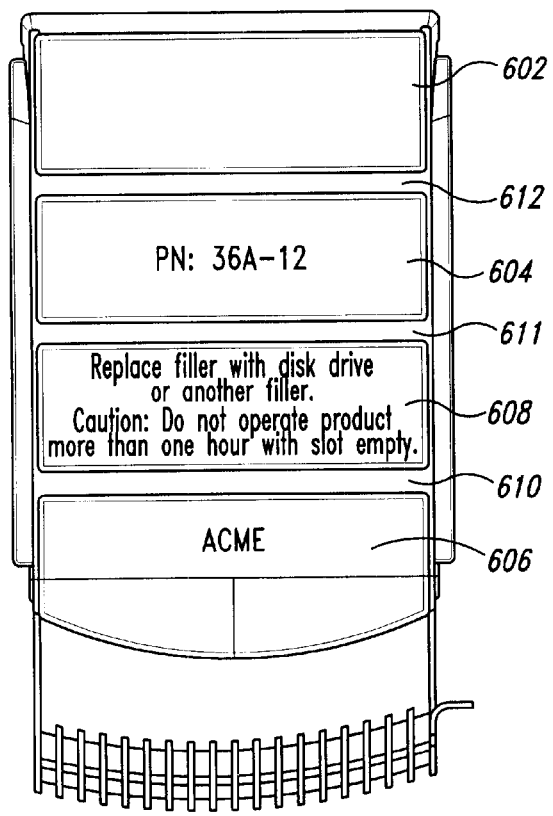
FIG. 6 is a plan view of the five-sided hard disk drive filler viewed from the bottom.
Figure 7:
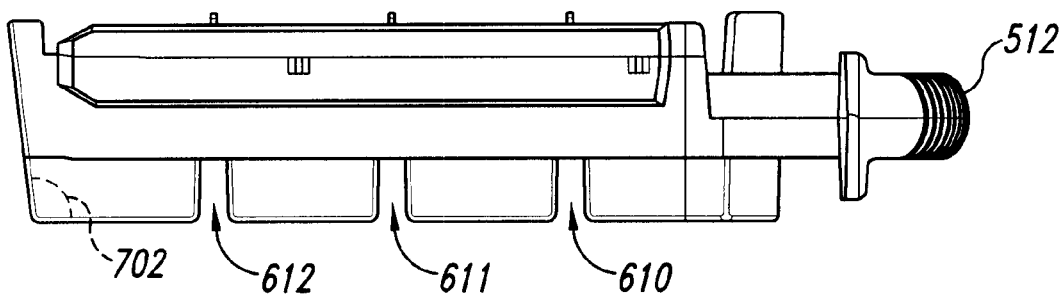
FIG. 7 is a side view of the five-sided hard disk drive filler.
Figure 8:
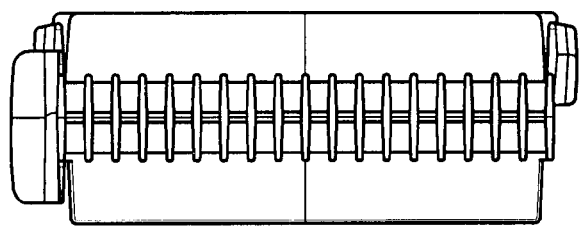
FIG. 8 is a front elevational view of the five-sided hard disk drive filler.

A five-sided, injection-molded hard disk drive filler ("5SHDDF") that represents one embodiment of the present invention is shown in two views included in FIGS. 5–8. FIG. 5 shows an isometric representation of the five-sided hard disk drive filler viewed from front to back and from top to bottom. FIG. 6 is a plan view of the five-sided hard disk drive filler viewed from the bottom. FIG. 7 is a side view of the five-sided hard disk drive filler. FIG. 8 is a front elevational view of the five-sided hard disk drive filler. Features of the 5SHDDF first described with reference to FIG. 5 are labeled with numeric labels between 500 and 599, features of the 5SHDDF first described with reference to FIG. 6 are labeled with numeric labels between 600 and 699, and features first described with reference to FIG. 7 are labeled with numeric labels between 700 and 799, respectively.

Figure 4:
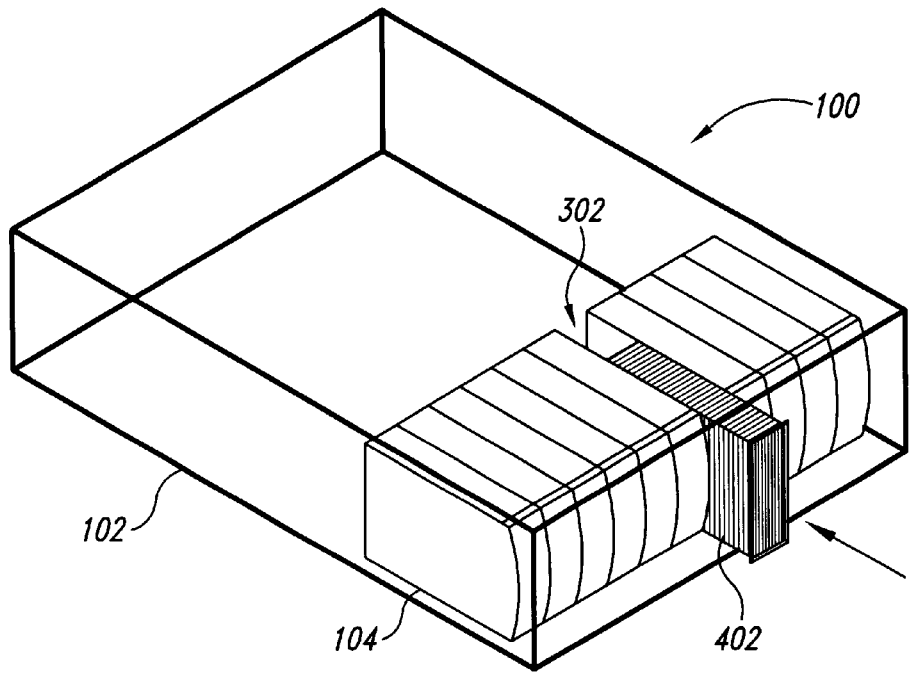
FIG. 4 shows a rectangular-block-like hard disk drive filler inserted into an open slot resulting from removal of a hard disk drive from the bank of hard disk drives of a disk array.

The 5SHDDF is injection molded as a single piece from durable, flame-resistant plastic polymer. The 5SHDDF includes a right-hand vertical side 502, a left-hand vertical side 504, a curved front face 506, a backside 508, and a bottom horizontal side 602. In addition, the 5SHDDF includes a molded handle 512 that extends outward beyond the front face 506 to allow an operator to grasp the 5SHDDF, easily insert the 5SHDDF into a bank of disk drives, and easily remove the 5SHDDF from the bank of disk drives. Rather than having a top horizontal side, the 5SHDDF is open at the top to form an open tray-like object. The 5SHDDF includes three hollow, wedge-shaped vertical baffles 514–516 that span the tray-like enclosure formed by the right-hand vertical side 502, left-hand vertical side 504, backside 508, front face 506, and horizontal bottom side 510. The three vertical baffles serve to sufficiently disrupt airflow across the open top horizontal side to produce airflow characteristics similar to a hard disk drive. Note that the 5SHDDF shown in FIG. 5 is rotated 90° degrees along a central axis intersecting the centers of the front face 506, the three baffles 514–516, and the back side 508 to a vertical orientation for insertion into the bank of disk drives within the disk array, an orientation equivalent to that of the six-sided filler shown in FIG. 4.

The 5SHDDF shown in FIG. 5 includes a part number 604, a product label 606, and a warning message 608 imprinted during the injection-molding process into the bottom horizontal side 602. The part number allows for easy identification of a particular type of 5SHDDF during manufacture, inventorying, shipping, and use. The product label provides manufacturer identification and the warning label serves to provide information to users with regard to operation of the disk array with and without 5SHDDFs inserted into open slots. For example, the warning label may indicate that the disk array should not be operated for more than a limited period of time without insertion of 5SHDDFs into all open slots within the bank of hard disk drives of a disk array. Trademarks, trademark symbols, and other such information may also be imprinted on the 5SHDDF during the injection-molding process. The 5SHDDF is manufactured with internal angles (for example, internal angle 702) between the horizontal bottom 510 and the front face 506, back 508, and vertical sides 502 and 504 slightly greater than 90°, and open channels 610, 612 within the wedge-shaped baffles 514–516 to allow 5SHDDFs to be easily and compactly stacked together, or nested, for storage and shipment. This stackability decreases the volume per 5SHDDF within shipped packages, which, in turn, decreases the weight of shipped packages. Thus, the 5SHDDF embodiment of the present invention provides the airflow characteristics of a hard disk drive when inserted into a bank of disk drives within a disk array while, at the same time, providing for cost effective and simple manufacture, durability, flame resistance, imprinted information disclosure, and reliable manufactured tolerances and characteristics.

Although the present invention has been described in terms of a particular embodiment, it is not intended that the invention be limited to this embodiment. Modifications within the spirit of the invention will be apparent to those skilled in the art. For example, a five-sided hard disk drive filler may be manufactured from many different types of flame-resistance and durable polymers in many different sizes and shapes appropriate to particular applications. In the disclosed embodiment, three baffles are employed, but more or less baffles may be appropriate for particular applications. The handles shown in the disclosed embodiment may be replaced with tabs or other features in alternative embodiments. While the disclosed embodiment replaces hard disk drives in a bank of disk drives within a disk array, similar fillers for other types of removable components may be constructed according to the present invention to have appropriate airflow modifying characteristics while also being stackable and economically and easily manufactured.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A filler that replaces a removable component within a system having components cooled by heat exchange from heat-producing components to a flowing fluid, the filler comprising:

an open, tray-like, injection-molded body with external dimensions equivalent to the solid removable component having a solid side and an open side;

a handle extending from, and continuous with, the tray-like body; and baffles extending from, and continuous with, an interior surface of the tray-like body that produce fluid-flow modifying characteristics across the open side of the tray-like body similar to the fluid-flow modifying characteristics across an equivalent side of the removable component.

2. The filler of claim 1 manufactured from a flame-resistant and durable polymer.

3. The filler of claim 1 wherein the interior surfaces of the tray-like body are complementary in shape to the exterior surfaces of the tray-like body so that the filler can be stacked together with a number of additional fillers within a volume smaller than the sum of the volumes of an equal number of removable components.

4. The filler of claim 1 further including imprinted alphanumeric symbols on external surfaces.

5. The filler of claim 1 wherein the imprinted alphanumeric symbols may comprise one or more of:

operational information;

warning information;

a manufacturer identifier;

a trademark; and a part identifier.

6. The filler of claim 1 wherein the baffles are hollow, allowing baffles of a second filler to be inserted into the hollow baffles to allow for close stacking of the filler with the second filler.

7. The filler of claim 6 wherein the tray-like body includes a number of approximately vertical sides, the approximately vertical sides angled slightly greater than 90° away from the solid side to further facilitate close stacking of the filler with the second filler.

8. The filler of claim 1 wherein the removable component is a hard disk drive, the system is a disk array cooled by air drawn into the disk array by fans, past disk drives within the disk array, and then expelled from the disk array by an electric fan.

9. A hard disk drive filler that fills an open slot left in a bank of hard disk drives within a disk array, the disk array cooled by heat exchange from heat-producing components to air forced through the disk array by an electric fan, the filler comprising:

an open, tray-like, injection-molded body with external dimensions equivalent to a hard disk drive and having a solid side and an open side; and baffles extending from an interior surface of the sold side that produce turbulent air-flow characteristics across the open side of the tray-like body that permit a flow of air between the open side of the tray-like body and an adjacent hard disk drive similar to the flow of air between two adjacent hard disk drives.

10. The hard disk drive filler of claim 9 further including a handle extending from, and continuous with, the tray-like body.

11. The hard disk drive filler of claim 9 manufactured from a flame-resistant and durable polymer.

12. The hard disk drive filler of claim 9 wherein the interior surfaces of the tray-like body are complementary in shape to the exterior surfaces of the tray-like body so that the hard disk drive filler can be stacked together with a number of additional hard disk drive fillers within a volume smaller than the sum of the volumes of an equal number of removable components.

13. The hard disk drive filler of claim 9 further including imprinted alphanumeric symbols on external surfaces.

14. The hard disk drive filler of claim 9 wherein the imprinted alphanumeric symbols are imprinted on the exterior surface of the solid side and may comprise one or more of:

operational information;

warning information;

a manufacturer identifier;

a trademark; and a part identifier.

15. The hard disk drive filler of claim 9 wherein the baffles are hollow, allowing baffles of a second hard disk drive filler to be inserted into the hollow baffles to allow for close stacking of the hard disk drive filler with the second hard disk drive filler.

16. The hard disk drive filler of claim 6 wherein the tray-like body includes a number of approximately vertical sides, the approximately vertical sides angled slightly greater than 90° away from the solid side to further facilitate close stacking of the hard disk drive filler with the second filler.

* * * * *

UNITED STATES PATENT AND TRADEMARK OFFICE
CERTIFICATE OF CORRECTION

PATENT NO. : 6,480,379 B1
DATED : November 12, 2002
INVENTOR(S) : David Dickey et al.

It is certified that error appears in the above-identified patent and that said Letters Patent is hereby corrected as shown below:

Title page, Item [54] and Column 1, line 1,
Title, delete "FILTER" and insert therefor -- FILLER --

Column 6,
Line 9, delete "sold" and insert therefor -- solid --

Column 7,
Line 1, delete "6" and insert therefor -- 7 --

Signed and Sealed this

Thirteenth Day of July, 2004

JON W. DUDAS
*Acting Director of the United States Patent and Trademark Office*